Dec. 20, 1960     O. L. KNUTSEN     2,965,269
CONTAINERS FOR POWDERED AND GRANULAR SUBSTANCES
Filed Feb. 21, 1957     2 Sheets-Sheet 1
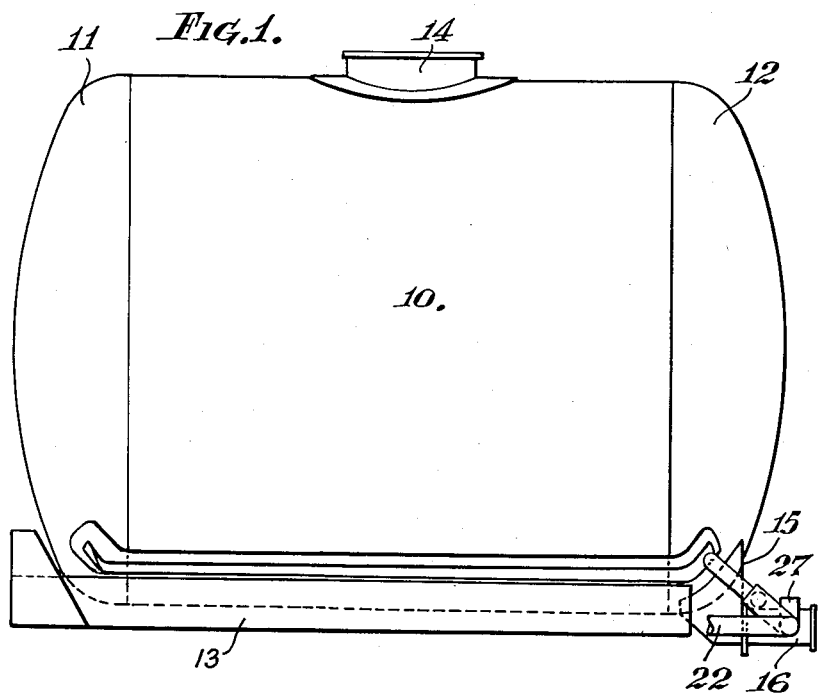
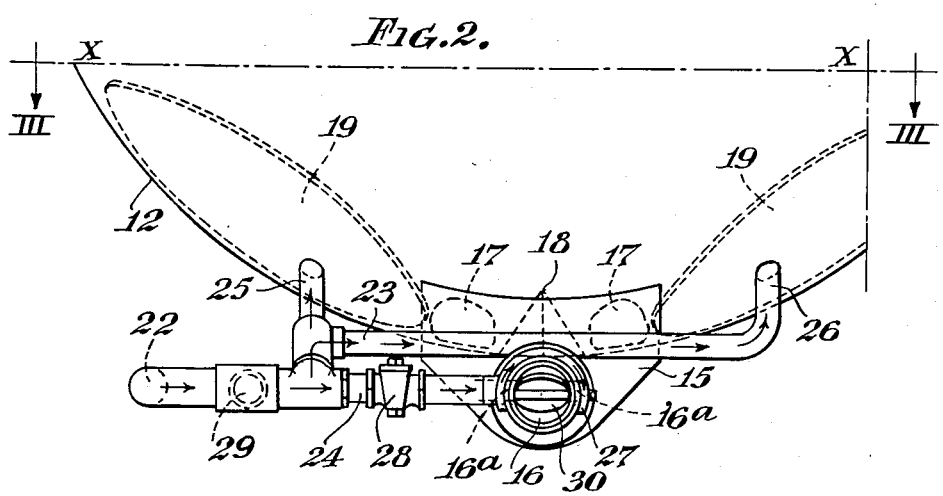
INVENTOR
OIVIND L. KNUTSEN Dec. 20, 1960   O. L. KNUTSEN   2,965,269
CONTAINERS FOR POWDERED AND GRANULAR SUBSTANCES
Filed Feb. 21, 1957   2 Sheets-Sheet 2
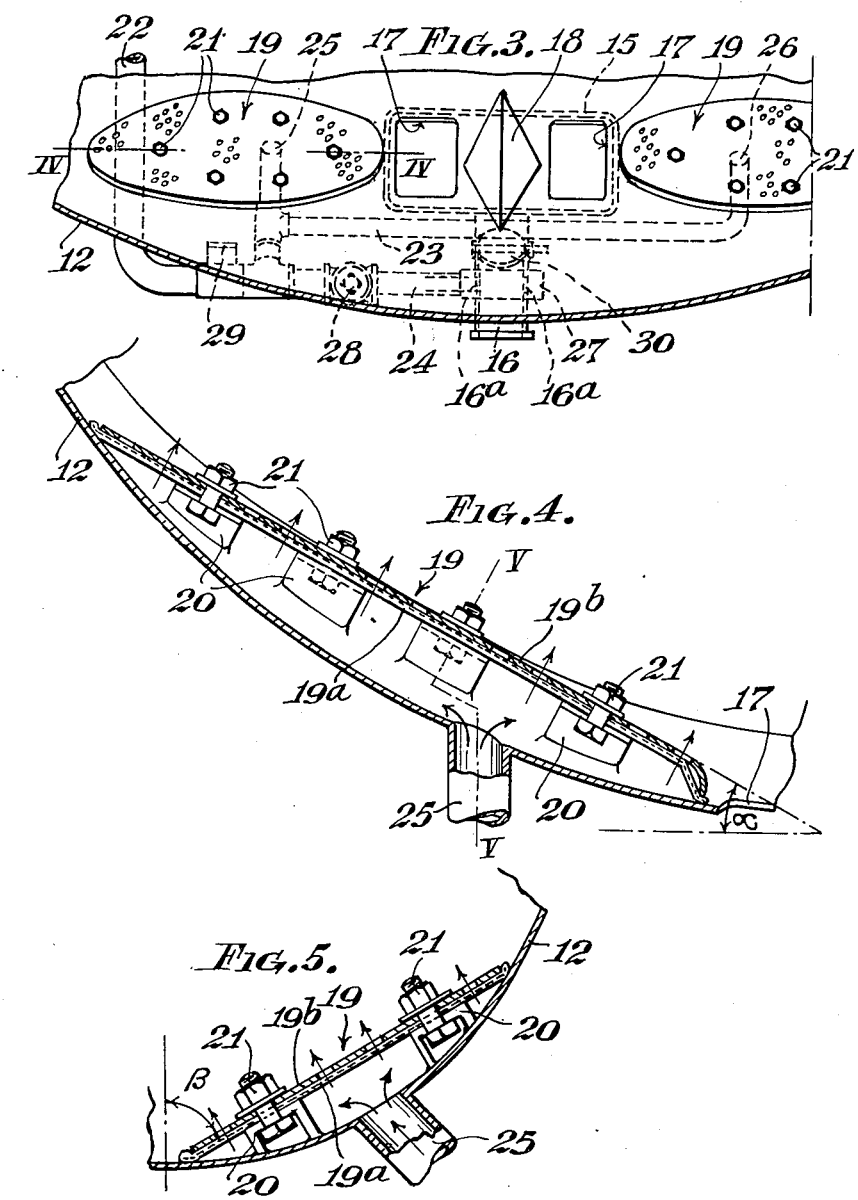
INVENTOR
OIVIND L. KNUTSEN
By Emory L. Groff
Atty United States Patent Office 2,965,269
Patented Dec. 20, 1960

2,965,269
CONTAINERS FOR POWDERED AND GRANULAR SUBSTANCES

Oivind Lind Knutsen, The Lindens, Green Lane, Broad Heath, near Worcester, Worcestershire, England, assignor to Margaret Ena Knutsen, Broad Heath, near Worcester, England Filed Feb. 21, 1957, Ser. No. 641,534

Claims priority, application Great Britain Feb. 21, 1956

6 Claims. (Cl. 222—195)

The present invention relates to containers for powdered and granular substances, and a method of removing powdered substances from such containers, and concerns containers which are filled at a location and then transported, the contents being discharged, possibly to storage vessels or the like above the level of the container.

The invention concerns in particular the removal of substances from containers wherein the container is tilted and air under pressure is applied to a discharge outlet located at or near the bottom of the tilted container, and the powdered substance in the container is agitated in order to fluidize same, and cause it to flow out of a discharge pipe or the equivalent where the air pressure forces the powdered substance through ducting connected to said pipe into a storage bin hopper or other container.

It is to be understood that the agitation such as by aeration of powdered or pulverized substances in a container to facilitate the pouring of same from an outlet is a well known expedient. Such agitation is to serve the purpose of breaking up packed locations, and to prevent the forming of voids in the substance in the container, at least in the location of the outlet. In fact, the purpose of agitation is to make the powder behave as a fluid and this process is generally known as a "fluidization" process. Such processes are well known, as applied to storage bins or hoppers from which the substance is to be discharged by gravity, utilizing porous pads in the container in the location of the outlet and through which air is forced to fluidize the powdered substance in this location.

The present invention is concerned with a container which can be mounted on the body or chassis of a vehicle, from which container pulverized or powdered substance can be discharged by tilting the container, the discharge being assisted by a fluidization process as above defined.

An important object of the invention is to provide a container of compact form enabling maximum capacity of the vehicle to be used, having no overhanging or projecting parts and with a low center of gravity, from which container powdered or pulverized substances can be discharged easily and quickly, and if desired, into storage bins having inlets well above ground level, for example 30–40 feet above, and by utilizing air pressure to assist in the discharge.

A further object of the invention is to provide a container which can be fabricated easily and from which the powdered or pulverized substance can be removed and elevated against gravity by air pressure and without using excessive quantities of air. Yet another object is to provide a container in which the contained powdered or pulverized substance is caused to flow evenly from an outlet as a fluid and also force fed therefrom and subsequently after leaving the container, is conveyed upwardly against the force of gravity.

The objects of the invention are achieved by the particular construction of the container, and the provision of means for fluidizing the substance in the container adjacent its outlet and by applying air pressure to cause the removal, as defined in the appended claims.

In order that a clear understanding of the invention may be obtained, reference will now be made to the accompanying drawings which show a preferred embodiment of the invention as a non limitative example, and wherein:

Figure 1 is a side view of the complete container,

Figure 2 is a fragmentary rear view to a larger scale,

Figure 3 is a fragmentary sectional plan view also to a larger scale on the line III—III, Figure 2, Figures 4 and 5 are sections on the line IV—IV, Figure 3 and V—V, Figure 4, respectively, showing the agitator wall.

As will be seen from Figure 1, the container 10 is cylindrical and has dished or convex end plates 11, 12. Substantially flat plates could be used, in which case a curved circumferential rim will be provided for uniting to the main cylindrical body to provide a corner radius. The container will in use be mounted on a suitable vehicle, such as a road vehicle on which supports to receive and hold same are fitted, for example, girder like supports designated 13 in Figure 1. The vehicle will be provided with means in the usual form whereby the container can be inclined for discharging its contents. A loading hatch 14 is provided which is air-tight when closed. The container may be mounted in a manner such that it can be loaded on to or removed from its supports readily.

The contents of the container are discharged from the rear end plate 12, through a trough-like dispensing chamber 15 and discharge pipe and outlet nozzle 16, which latter is constructed so that transfer ducting can be coupled thereto, there being provided two apertures 17, 17, through the end plate 12, symmetrically disposed about the longitudinal center line of the container whereby the contents can pass through the apertures 17, 17, which constitute the outlet from the container into the dispensing chamber 15.

In order to reduce the possibility of packing of the powder in the vicinity of the apertures, a deflector consisting of a plate assembly 18 is provided. This assembly provides an inverted V or ridge like member providing an inclined surface at each side feeding into one of the apertures 17. The ridge of the member may be horizontal (in the normal discharge inclination) and may have a part at its forward end which slopes down to meet the wall of the end plate.

Two porous agitator plate or wall assemblies 19, 19 are provided, these being located one on each side of the longitudinal vertical center plane and symmetrically disposed, being arranged V-wise in or mainly in the curved end plate and sloping or inclining down each to its adjacent outlet aperture and also down away from the end plate, being located in the corner radius of the end plate. The agitators are fixed in the container in any suitable way, for example by providing a number of spaced apart bolt-head anchoring boxes 20, shown in Figures 4 and 5, welded to the inner wall of the end plate, and retaining the assemblies by nuts and bolts 21, 21. Each assembly 19 as shown in Figures 4 and 5 consists of a filter sheet 19a, and a perforated or grid plate 19b. The grid is formed with edges shaped to hold the filter sheet edges on to the container, thereby sealing off the space below the assembly from the remaining interior of the container.

It has been found that efficient working is secured if the angle $\alpha$ is made approximately 35°, Figure 4, and the angle $\beta$ approximately 55°, Figure 5.

Air is supplied under pressure to beneath both wall assemblies 19, so as to pass therethrough and upwardly into the container. The air is supplied from an air blower or other external source to a pipe 22, which feeds to two main branches 23, 24, the branch 23 itself dividing into the pipes 25, 26, both feeding into the end plate 12, one below each porous assembly.

The branch 24 is connected to a coupling branch or yoke 27 which supplies air to the discharge pipe of the outlet nozzle 16 and to opposite sides thereof through apertures 16a, 16a. A plug-cock valve 28 is incorporated whereby the air supply to the nozzle can be interrupted or varied in relation to the air supply to beneath the assemblies 19, 19. A safety valve 29 is also provided. The outlet may further be controlled by means of a butterfly valve 30, while a valve may be fitted in the feed to beneath the assemblies 19, 19.

The deflector plate assembly also could be omitted and a single outlet aperture or a number of apertures, one centrally of the discharge chamber, be provided.

In use, the container is filled with the powdered substance through the hatch 14, which is then closed to seal the container. In order to discharge the container, its front end is raised to obtain a tilt angle of about 30° to horizontal. The outlet nozzle of the discharge pipe 16 is connected to ducting which leads to the storage hopper or bin. The butterfly valve is opened and air under pressure is introduced into the discharge pipe 16 and also to the container at appropriate relative pressures. The air introduced into the container is diffused by its passage through the porous pads 19a and fluidizes the powder in the vicinity of the outlet apertures 17 which results in the powder falling into the dispensing chamber 15 and so into the discharge pipe 16 where it is further fluidized and carried through the outlet into the ducting, by which it is conveyed to a receiving bin or hopper which may be above, at, or below ground level.

When the discharge nears completion, the container is tilted further to a tilt angle of about 45°, and the air supply to the discharge outlet 16 reduced or closed, but is still maintained to the agitators. A fresh outlet flow is always obtained since when the powder falls on to the agitators it is fluidized.

The additional air introduced into the discharge pipe further fluidizes the powder, so that it is possible to carry same through ducting up into a storage hopper if desired.

When the discharge is complete, the container is returned to its normal travelling position, the outlet valve closed and the ducting and air supply disconnected.

The provision of the outlet valve to the discharge pipe and the valve controlling the air feed to the discharge pipe enables the ratio of air-to-powder to be controlled and varied as required, thus making it unnecessary to use high pressure even when the powder has to be lifted. A pressure of about 10 p.s.i. is sufficient under all circumstances normally encountered.

An important feature of the invention is that the porous pads are located so that there is no possibility of powder bridging the corner radius of the end plate 12 when the container is tilted, and in fact, fluidization occurs in these locations whereby the powder is kept moving continuously in the lower part of the end plate. No powder can pass to below the pads.

It will be understood that air under pressure is normally necessary for supply to the discharge nozzle, whereby such air under pressure can be used conveniently for the agitation. By regulation of the air pressure on the one hand into the container beneath the walls to effect agitation and on the other hand to the discharge outlet, the discharge of the powdered substances is under control under all conditions. For example, where the powder is to be raised to a height of say 40 feet, the air is controlled so that the proportion of air to powder leaving the discharge pipe is greater than when the powder is to be raised to a much less height.

The construction herein permits of a low center of gravity when the container is used on road or rail vehicles. Further, maximum capacity of the vehicle can be used as the container has no cone or spout like rear end.

Mechanical agitators could be provided. For example, vibrators can be provided in place of the porous assemblies.

The rear plate 12 of the container can be made with a lower part, e.g. below the line X—X, Figure 2, hinged. With such an arrangement it is possible to use the container for the transportation of coarse or granular substances such as stone chips, which can simply be allowed to fall by gravity from the container by swinging up the hinged part.

I claim:

1. Transportable container for powdered substances, comprising a hollow cylindrical main body, dished end walls to said body, a sealable filling hatch into said body, an outlet from the bottom of one of said end walls, said outlet comprising two apertures located one on each side of the longitudinal center line of the container, a dispensing chamber beneath said outlet, a deflector within the container, said deflector comprising an inverted V-shaped baffle located above the apertures to deflect powder to flow down and out through both apertures into the dispensing chamber, porous wall elements in said container in the locality of the corner radius of the said one end wall and positioned one on each side of said baffle and located V-wise and symmetrically with respect thereto, means for introducing air under controlled pressure to beneath said elements to cause the fluidization of powder thereabove which will fall on to the deflector and out of the outlet comprising the apertures and also build up a pressure within the container, a discharge pipe from said discharge chamber and means for introducing air under controlled pressure into said discharge pipe.

2. Transportable container for powdered substances as claimed in claim 1, wherein the porous wall elements comprise upper perforated rigid plates, and lower porous pads, said elements sloping from the end wall down to the main body as well as V-wise.

3. A transportable container for powdered substances comprising, a hollow cylindrical main body disposed so that its axis is horizontally disposed and having dished end walls, a sealable filling hatch into said body, an outlet opening in the bottom of one of said end walls, a dispensing chamber beneath said outlet, a discharge pipe leading from said chamber, porous wall elements in said container in the locality of the corner radius of said one of said dished end walls and positioned one on each side of said outlet, and arranged V-wise symmetrically with respect to the vertical and to said outlet, an air feed pipe, two main branches from said pipe, one of said branches feeding air under pressure into said container beneath said porous wall elements, the other of said branches feeding air under pressure into said discharge pipe, and adjustable control means for both of said two main branches.

4. A transportable container for powdered substances comprising, a hollow cylindrical main body disposed so that its axis is horizontally disposed and having dished end walls, a sealable filling hatch into said body, an outlet from said body at the bottom of one end wall, two porous agitator pads within the container disposed one on each side of said outlet and V-wise symmetrically with respect to the vertical and to said outlet, a discharge chamber connected to said outlet, a discharge pipe leading from said discharge chamber, means for introducing air under pressure into said container beneath each of said porous agitator pads and also into the discharge pipe, and adjustable control means for regulating the air pressure into the container and said discharge pipe.

5. A transportable container for powdered substances including an annular portion having an opening from which said substances are discharged, means at said opening providing a trough-like dispensing chamber, a discharge pipe for said chamber, perforated plates arranged at opposite sides of said opening and supported as chords with respect to related annular portions of the body to provide pressurized air compartments to cause air passing through said plates to render the powdered substance fluidized, pipe means in valved communication with said dispensing chamber, and other pipe means establishing communication with said pressurized air chambers at a point upstream of the valve in said first named pipe means.

6. A transportable container for powdered substances and having an opening in a wall thereof, means forming a dispensing chamber in communication with said opening of the container, a discharge pipe communicating at one end with said dispensing chamber, a butterfly valve in said discharge pipe, means at opposite sides of the opening in the container cooperating therewith to form pressurized air chambers and having perforated walls facing the interior storage space of the container, a source of compressed air supply, pipe means between said source of air supply and the discharge pipe downstream of the butterfly valve, a control valve in said pipe means, and other pipe means communicating with the said source of air supply upstream of said control valve and also communicating with said pressurized air chambers to effect quiescent agitation and dispersion of the powdered material in the container to provide a fluidized stream of material passing through said discharge pipe.

References Cited in the file of this patent

UNITED STATES PATENTS

| | | |
|---|---|---|
| 2,425,419 | Carnes | Aug. 12, 1947 |
| 2,609,125 | Schemm | Sept. 2, 1952 |
| 2,665,035 | Schemm | Jan. 5, 1954 |
| 2,721,006 | Knutsen | Oct. 18, 1955 |

FOREIGN PATENTS

| | | |
|---|---|---|
| 703,852 | Great Britain | Feb. 10, 1954 |